United States Patent [19]
Sota

[11] Patent Number: 5,332,167
[45] Date of Patent: Jul. 26, 1994

[54] APPARATUS FOR AUTOMATICALLY CUTTING AND ATTACHING LENGTHS OF LEADER TAPE TO LENGTHS OF MAGNETIC TAPE AND WINDING THEM ONTO SUPPLY AND TAKE UP REELS

[75] Inventor: Koichi Sota, Chohu, Japan
[73] Assignee: Otari Inc., Tokyo, Japan
[21] Appl. No.: 809,305
[22] Filed: Dec. 17, 1991
[30] Foreign Application Priority Data
  Dec. 27, 1990 [JP] Japan ............... 2-416148
  Jul. 26, 1991 [JP] Japan ............... 3-187223
[51] Int. Cl.⁵ ............... G65H 18/00; G65H 21/00
[52] U.S. Cl. ............... 242/527; 242/532.1
[58] Field of Search ............ 242/56 R; 156/505, 506, 156/502

[56] References Cited
U.S. PATENT DOCUMENTS 3,677,505  7/1972  Van Taylor ............... 242/56 R
3,737,358  6/1973  King ..................... 242/56 R
4,501,630  2/1985  Kiuchi ................... 156/505
4,629,138 12/1986  Kubo .................... 242/56 R Primary Examiner—Daniel P. Stodola
Assistant Examiner—John Q. Nguyen
Attorney, Agent, or Firm—Philip M. Shaw, Jr.

[57] ABSTRACT

A clamping mechanism clamps the free end of a leader tape onto a hub, a moving mechanism moves the hub together with the clamped leader tape end to a winding position, a cutting device cuts the leader tape a predetermined distance from the hub clamped onto the free end of the leader tape, a splicing mechanism splices the cut end of the leader tape to a free end of a magnetic tape, and a revolving mechanism then winds the spliced together leader tape and magnetic tape onto the hub. When the winding of the spliced together leader tape and magnetic tape is completed, the cutting device cuts the magnetic tape, and the splicing mechanism splices the cut end of the magnetic tape with the cut end of a leader tape. The clamping mechanism then cuts the leader tape having the magnetic tape spliced therewith, and clamps another hub to the free end of the leader tape.

2 Claims, 14 Drawing Sheets

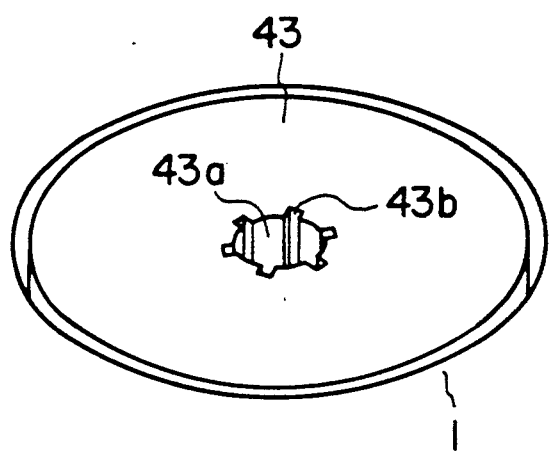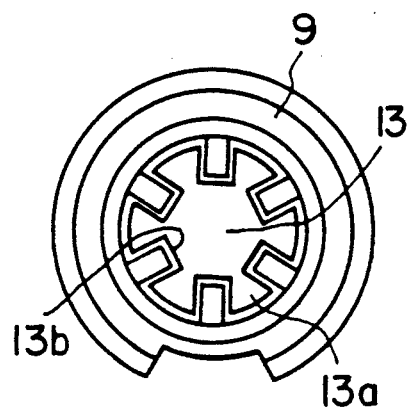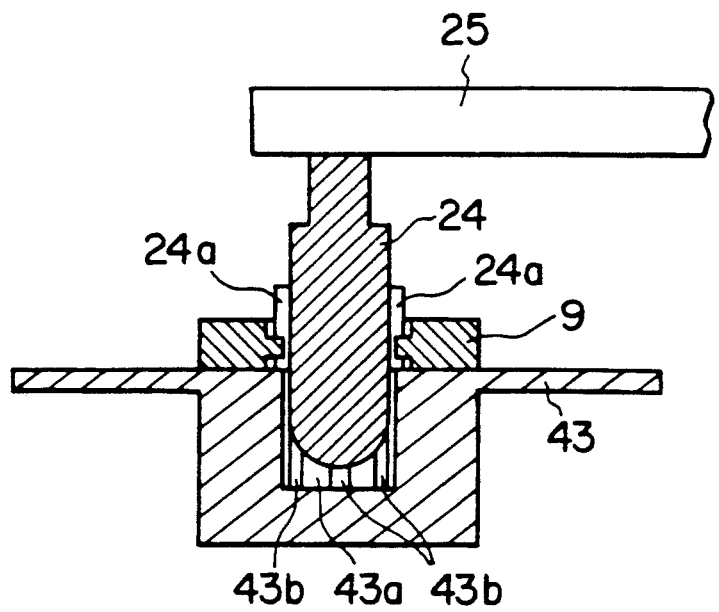

APPARATUS FOR AUTOMATICALLY CUTTING AND ATTACHING LENGTHS OF LEADER TAPE TO LENGTHS OF MAGNETIC TAPE AND WINDING THEM ONTO SUPPLY AND TAKE UP REELS

BACKGROUND OF THE INVENTION

The present invention relates to an apparatus for winding magnetic tape and leader tape onto hubs. A conventional cassette tape fabrication is made in the way that as shown in FIG. 13, a long wound magnetic tape 6 is wound onto a pair of hubs 9 to a predetermined length, which is put in a cassette case. The pair of hubs having the magnetic tape wound thereon to the predetermined length is called the spectacles herein.

In fabricating the spectacles, the magnetic tape 6 may be damaged when the magnetic tape 6 is directly wound onto the hubs 9.

To avoid this, leader tape 3 is wound onto the innermost and outermost turns to protect the magnetic tape 6. For the reason, fabrication of the spectacles has to be made according to the following steps. Each of the hubs is clamped onto one end of the leader tape of a predetermined length by a clamping arrangement. The hubs are moved to and put on a winding arrangement by hand or a belt conveyor or the like. The leader tape clamped onto the hubs by the winding arrangement is then cut. The magnetic tape is spliced to one of the cut ends. The hub having the magnetic tape spliced thereto is turned to wind the magnetic tape thereon to a predetermined length. Then, the magnetic tape is cut. The magnetic tape is spliced to the other end of the leader tape. This completes the spectacles. The fabrication of the spectacles, as described above, needs two different arrangements for the clamping step and the winding step.

Also, the spectacles can be fabricated in another, similar method of two steps. In the first step, a long magnetic tape is prespliced with predetermined lengths of leader tape at certain intervals to produce a magnetic tape with leader tape segments.

In the second step, the magnetic tape with the leader tape segments is supplied and cut at the leader tape segments. One end of the cut leader tape segment is clamped onto a first hub. The clamped hub is revolved to start winding the magnetic tape and the leader tape. Then, the next leader tape segment is cut. The cut end is clamped onto a second hub. This completes the spectacles. This fabrication method also needs two different arrangements in the first and second steps.

Either of these two conventional methods for fabricating the spectacles described above has to use two arrangements. The use of the two arrangements involves the problem that it not only takes some time to move in-fabrication parts between the two arrangements, but also has to use man power or a different arrangement for the moving step. This raises the production cost.

Also, in fabricating the magnetic tape with leader tape segments, various kinds of tape have to be produced. This involves the problem that control is complicated in winding the tape onto the hubs.

In order to solve the problems described above, the Japanese Patent Application Hei 2-416148 discloses an apparatus. This apparatus comprises a clamping arrangement for clamping a hub onto each end of a leader tape of a predetermined length, a winding arrangement for winding magnetic tape onto the hub clamped to the leader tape, and a moving arrangement for holding the outside of the hub clamped onto the leader tape and moving it from the clamping arrangement to the winding arrangement. This single unit of apparatus can fabricate the spectacles having the leader tape and the magnetic tape wound thereon.

However, the preceding apparatus has the disadvantage that it is complicated in its construction and takes a long production time as it includes the conventional arrangements for the fabrication steps. That is, in fabricating the spectacles with the preceding apparatus, a pair of hubs having the leader tape clamped with the clamping arrangement is made once. It is moved to the winding arrangement by the moving arrangement. The leader tape and the magnetic tape are cut and spliced together. The magnetic tape then is wound.

SUMMARY OF THE INVENTION

In view of the foregoing, it is a general object of the present invention to provide an apparatus for winding magnetic tape, and more particularly concerns an apparatus of simple construction for winding magnetic tape by which spectacles having the magnetic tape and leader tape wound thereon can be fabricated in a short production cycle.

Briefly, the foregoing object is accomplished in accordance with aspects of the present invention by an apparatus for winding magnetic tape comprising, in combination: magnetic tape; leader tape; hubs; leader tape supplying means for supplying the leader tape; magnetic tape supplying means for supplying the magnetic tape; clamping means for cutting the leader tape supplied from the leader tape supplying means and for clamping a separate hub onto each cut end of the leader tape, one of the hubs being clamped to the end of the leader tape from the leader tape supplying means; moving means for moving the one hub along a traveling path to a winding position; cutting and splicing means for selectively cutting either the leader tape or the magnetic tape and for splicing the cut leader tape with the magnetic tape; and revolving means for revolving the one hub at the winding position.

Preferably the embodiment of the apparatus for winding magnetic tape according to the present invention further comprises: shifting means for positioning the cutting and splicing means outside of the traveling path for the one hub moved by the moving means, for vacuum retaining the magnetic tape and the leader tape, and for selectively aligning a cut end of the magnetic tape with a cut end of the leader tape; cutting means for selectively cutting either the magnetic tape or the leader tape which is vacuum retained by the shifting means; splicing means for splicing together the end of the magnetic tape with the end of the leader tape cut by the cutting means; and guide means for guiding the magnetic tape and the leader tape onto the shifting means.

Furthermore, another embodiment of the apparatus for winding magnetic tape of the present invention comprises: shifting means for reciprocally moving the cutting and splicing means outside and inside the traveling path for the one hub moved by the moving means, for vacuum retaining the magnetic tape or the leader tape, and for selectively aligning the end of the magnetic tape with the end of the leader tape; cutting means for selectively cutting either the magnetic tape or the leader tape on the shifting means; and splicing means for splicing together the end of the magnetic tape with the end of the leader tape cut by the cutting means.

Furthermore, in still another embodiment of the apparatus for winding magnetic tape of the present invention, wherein the magnetic tape from the magnetic tape supplying means includes alternating transparent and nontransparent portions, detecting means detect a transparent portion and a nontransparent portion of the magnetic tape between the magnetic tape supplying means and the clamping means.

In operation, the clamp means clamps the end of the leader tape supplied by the leader tape supplying means to one of the hubs. The moving means moves this one hub to the winding position. The cutting and splicing means cuts the leader tape clamped onto this one hub and splices the cut end of the leader tape with a free end of the magnetic tape supplied from the magnetic tape supplying means. The revolving means revolves the hub having the spliced together leader tape and magnetic tape. This allows the leader tape and a predetermined length of the magnetic tape to be wound onto the one hub. When the winding of the spliced together leader tape and magnetic tape is completed, the cutting and splicing means cuts the magnetic tape and splices the cut end of the magnetic tape with the cut end of a Leader tape. The clamping means then cuts the leader tape having the magnetic tape spliced therewith and clamps another hub onto the free end of the leader tape.

Alternatively, if the cutting and splicing means is constructed so as to have the cutting device, the splicing means, the shifting means, and the guide means as well, then to cut and splice the tape with the leader, the guide means guides onto the shifting means either the magnetic tape or the leader tape out of the traveling path for the hub, and the shifting means vacuum retains the tape or the leader. Thereafter, the cutting device cuts the retained magnetic tape or leader tape. The shifting means aligns the end of the magnetic tape with end of the leader tape and the splicing means splices them together.

Alternatively, if the shifting means is made to move inside and outside the traveling path for the hub, then to cut and splice, the shifting means moves into the traveling path for the hub to vacuum retain the magnetic tape or the leader tape. After this, the cutting device cuts the retained magnetic tape or the leader tape. The shifting means aligns the end of the magnetic tape with end of the leader tape. The splicing means then splices the ends together. If the hub moves inside the traveling path, the shifting means moves to outside of the traveling path for the hub.

Alternatively, if the detecting device is provided, then the magnetic tape supplying means supplies a magnetic tape having already spliced in portions of leader tape. The clamping means clamps the leader tape portion of the magnetic tape onto the hub. The moving means then moves the hub having the leader tape portion clamped thereon to the winding position. The revolving means revolves the hub to wind the magnetic tape onto the hub. In turn, the detecting device detects the leader tape portion of the magnetic tape. After detection, the revolving means stops. The clamping means cuts the detected leader tape portion, and clamps the hub. The revolving means revolves the hub at the winding position again to pull to the winding position the hub having the leader tape clamped thereon.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 15 is an enlarged, perspective view for a reel table;

FIG. 16 is an enlarged, cross-sectional view for the reel table and the hub shaft engaged together;

FIG. 17 is an enlarged, cross-sectional view for a holding shaft and the hub engaged together.

DESCRIPTION OF THE PREFERRED EMBODIMENTS

Figure 1:
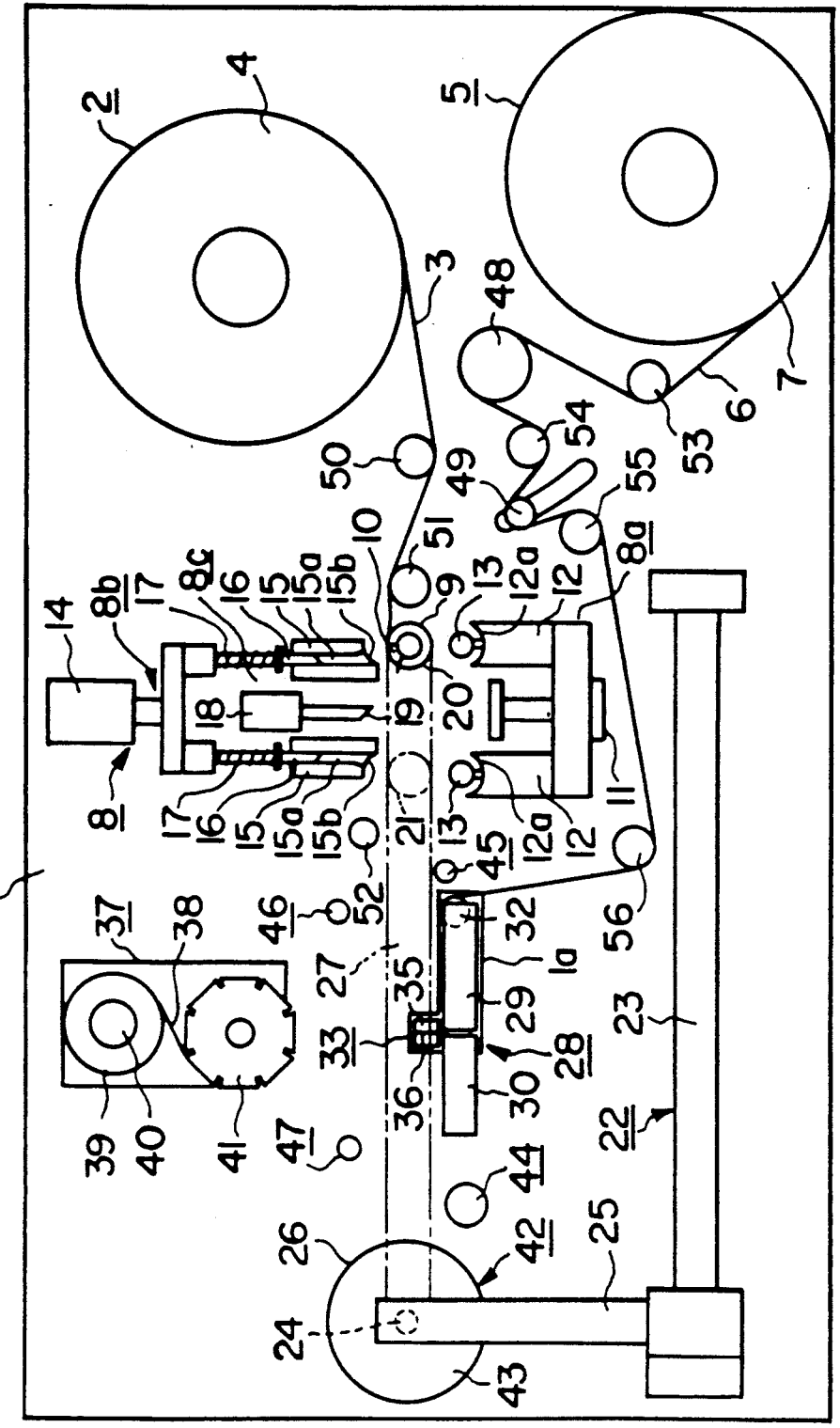
FIG. 1 is a plan view for a first embodiment of the present invention for an apparatus for winding magnetic tape with this set up.

The present invention is illustrated in further detail by reference to the accompanying drawings. FIG. 1 is a plan view for an embodiment of the present invention for an apparatus for winding magnetic tape. The apparatus for winding magnetic tape is built on a base plate 1 which is horizontal in the embodiment.

The apparatus consists chiefly of a leader tape supplying means 2, a magnetic tape supplying means 5, a clamping means 8, a moving means 22, a shifting means 28, a splicing means 37, and a revolving means 42.

The leader tape supplying means 2 supplies a leader tape 3 by causing a reel 4 having the leader tape 3 wound thereon to be revolved by a revolving drive (not shown). The magnetic tape supplying means 5 supplies a magnetic tape 6 by causing a reel 7 having the magnetic tape 6 wound thereon to be revolved by a revolving drive (not shown).

The clamping means 8 clamps the leader tape 3, by means of retaining pieces 10, onto hubs 9. The clamping means 8 comprises a hub placing means 8a for holding the hubs 9 in place, a leader tape clamping means 8b for clamping the leader tape 3 and the retaining pieces 10 onto the hubs 9, and a cutting device 8c for cutting the leader tape 3.

The hub placing means 8a comprises a reciprocal drive source 11, two retaining rods 12 for holding the hubs 9 on their outside surfaces, and two retaining shafts 13 for holding the hubs 9 by their center holes.

Each of the retaining rods 12 is mounted on the reciprocal drive source 11 and has an end 12a having virtually the same curvature as the respective outside surfaces of the hubs 9. Each of the retaining shafts 13 is mounted on the reciprocal drive source 11 and is shaped like a pillar having virtually the same diameter as the center holes of the hubs 9. The pillar has convex portions 13a and concave portions 13b which can fit with those formed in the respective center holes of the hubs 9, as shown in FIG. 17. The convex portions and concave portions allow the hubs 9 to be held on the retaining shafts 13 without turning. The retaining shafts 13 can be moved reciprocally by a reciprocal driving source (not shown) in a direction perpendicular to the base plate 1 so that they can be engaged with and released from the center holes of the hubs 9.

The leader tape clamping means 8b comprises two clamp holders 15, for guiding a reciprocal drive source 14 and the retaining pieces 10, and two clamp rods 16 for pushing the retaining pieces 10 supplied to the clamp holders 15 out to the hubs 9. The clamp holders 15 are shaped like blocks having grooves 15a, the widths of which are virtually the same as those of the retaining pieces 10. The clamp holders 15 have curved ends 15b which can make contact with the outside surfaces of the hubs 9. The clamp rods 16 are fixed on the reciprocal drive source 14 and are shaped like long blocks, the widths of which are a little thinner than the grooves 15a of the clamp holders 15, to reciprocally move in the grooves 15a of the clamp holders 15. A spring 17 is coiled around each of the clamp rods 16. If the reciprocal drive source 14 pushes the clamp rods 16 out toward the clamp positions 20 and 21 respectively, then the springs 17 push each of the clamp holders 15. If the clamp rods 16 return back, then the clamp holders 15 are returned back by rods (not shown).

The cutting device 8c comprises a reciprocal drive source 18 and a cutting blade 19 fixed on the reciprocal drive source 18. The cutting device 8c can cut the leader tape 3 between the two clamp holders 15.

The following describes the operation of the clamping means 8. The hubs 9 are fed manually, or by a parts feeder or the like, to the retaining shafts 13. The curved portions 12a of the retaining rods 12 are pushed out to the clamp positions 20 and 21 by the reciprocal drive source 11, to be held there. The retaining pieces 10 fed into the grooves 15a of the clamp holders 15 manually, or by the parts feeder or the like, are pushed out toward the clamp positions 20 and 21 as the reciprocal drive source 14 presses the clamp rods 16. The clamp holders 15 then are pushed by the springs 17 to move up to positions at which they touch the hubs 9 held at the clamp positions 20 and 21 as the clamp rods 16 are moved. The reciprocal drive source 14 further pushes the clamp rods 16 to move forward against the forces of the springs 17 to clamp the retaining pieces 10 onto the hubs 9 held at the clamp positions 20 and 21. This clamping is done while the leader tape 3 is held inbetween the hubs 9 and the retaining pieces 10. The cutting blade 19 is then moved toward the clamp positions 20 and 21 by the reciprocal drive source 18 to cut the leader tape 3 at a point midway between the two hubs 9 right before clamping.

The moving means 22 mentioned above allows the hubs 9 to move the leader tape 3 to a tape winding position. The moving means 22 comprises a first reciprocal drive source 23, a second reciprocal drive source (not shown), a hub shaft 24 (FIG. 14) which fits with the center hole of each of the hubs 9, and an arm 25 which connects the reciprocal drive source 23 with the hub shaft 24. The hub shaft 24 is shaped like a pillar having virtually the same diameter as the center hole of the hub 9 so as to fit with the convex portions and concave portions provided in the center hole. The hub shaft 24 has convex portions 24a and concave portions on its outside surface and is rotatably held on the arm 25.

The hub shaft 24 can be reciprocally moved by the reciprocal drive source 23 between the clamp position 20, on the side of the leader tape supplying means 2, and the tape winding position 26. The hub shaft 24 also can be moved in a direction (vertical direction in FIG. 14) perpendicular to the base plate 1 by the second reciprocal drive source (not shown). This movement allows the hub shaft 24 to take any of three positions: top, intermediate and bottom. The hub shaft 24 at the top position can be moved between the clamp position 20 and the winding position 26 without touching anything. At the intermediate position, the hub shaft 24 can be fitted into the center hole of the hub 9 on the base plate 1 without touching the base plate 1.

The hub shaft 24 can move the hub 9 from the clamp position 20 to the winding position 26 as if the hub shaft 24 slides on the base plate 1. In doing so, the hub 9 passes through a so-called traveling path 27. Movement of the hub shaft 24 at the bottom position will be described later.

Figure 2:
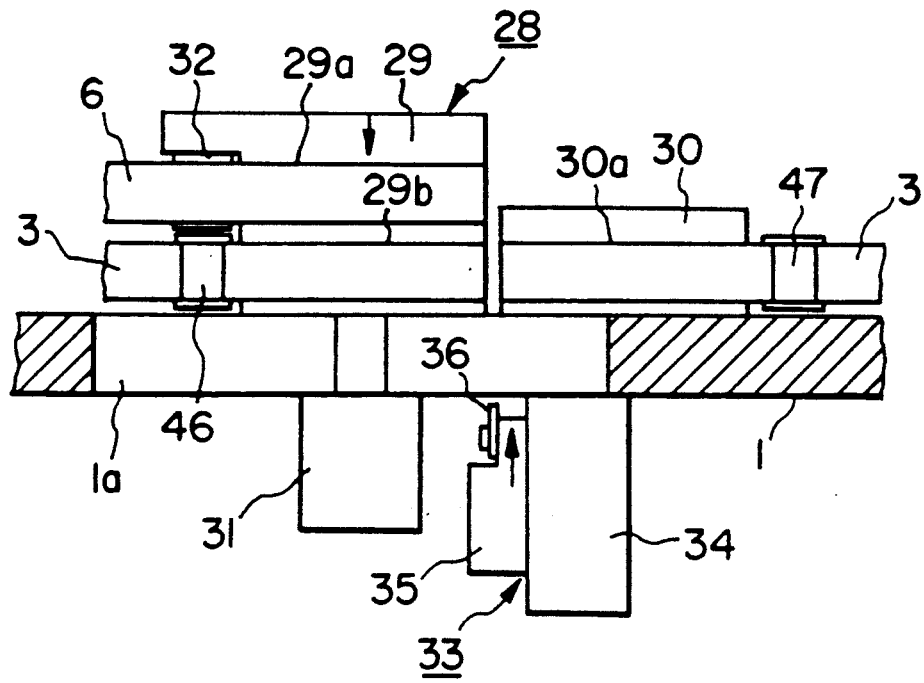
FIG. 2 is an enlarged vertical view, partially in cross-section, for a shifting means taken in the direction of arrows A—A of FIG. 5.
Figure 3:
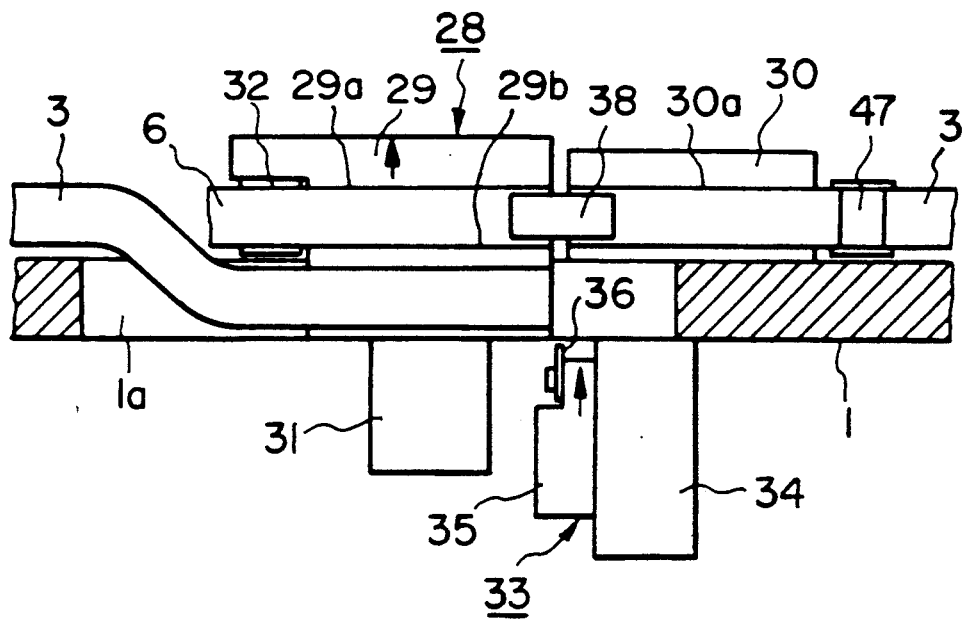
FIG. 3 is a view similar to FIG. 2 for the shifting means after it has moved.

The following, by reference to FIGS. 2 and 3, describes the above-mentioned shifting means 28 which can selectively mate together the cut end of the leader tape 3 and the cut end of the magnetic tape 6. FIGS. 2 and 3 are vertical views of the shifting means 28 taken in the direction of the arrows A—A in FIG. 5. The shifting means 28 comprises a first, moveable holding block 29, a second, stationary holding block 30, a reciprocal drive source 31, and a guide roller 32. The first holding block 29 is a block having two grooves 29a and 29b on one surface thereof. The widths of the grooves 29a and 29b are virtually the same as those of the leader tape 3 and the magnetic tape 6.

The second holding block 30 has one groove 30a on one surface thereof and the width of the groove 30a is the same as those of the grooves 29a and 29b of the first holding block 29. The reciprocal drive source 31 can move the first holding block 29 in a direction perpendicular to the base plate 1. This movement allows the first holding block 29 to select one of two positions: a first position as shown in FIG. 3, where the groove 30a of the stationary second holding block 30 is aligned with the groove 29a of the first holding block 29, or a second position, as shown in FIG. 2, where the groove 30a is aligned with the other groove 29b of the first holding block 29. The grooves 29a and 29b of the first holding block 29 and the groove 30a of the second holding block 30 each have a plurality of holes (not shown). An air suction means (not shown) sucks air through the holes to make the first holding block 29 and the second holding block 30 attract and hold, i.e. vacuum retain the leader tape 3 and the magnetic tape 6 to the grooves 29a, 29b and 30a. A guide roller 32 is fixed on the groove 29a of the first holding block 29 to guide the magnetic tape 6 supplied out of the magnetic tape supplying means 5 to the first holding block 29.

In turn, the following describes a cutting device 33 and the splicing means 37 mentioned above by reference to FIGS. 1, 2 and 3. The cutting device 33 comprises a reciprocal drive source 34, an arm 35 fixed on the reciprocal drive source 34, and a blade 36 fixed at an end of the arm 35. The blade 36 is moved by the reciprocal drive source 34 via the arm 35 in a direction perpendicular to the base plate 1 to pass between the first holding block 29 and the second holding block 30. This allows the blade 36 to selectively cut either the leader tape 3 or the magnetic tape 6 attracted to and held between the first holding block 29 and the second holding block 30. Note that the base plate 1 is provided with a through hole 1a so that the first holding block 29 and the cutting device 33 can be moved in the direction perpendicular to the base plate 1.

The splicing means 37 comprises a reel 39 having a splicing tape 38 wound thereon, a pillar block 40, a roller 41, a cutting device (not shown), and a reciprocal drive source (not shown). The pillar block 40 is a cylinder which holds a reel 39 having splicing tape 38 wound thereon to splice the leader tape 3 and the magnetic tape 6 together. The roller 41 is an approximately octagonal shaped roller which can be revolved to draw and feed the splicing tape 38 pulled out of the reel 39. The cutting device (not shown) can cut the splicing tape 38 on the roller 41 to a predetermined length. The reciprocal drive source (not shown) can move the pillar block 40 and the roller 41 toward the shifting means 28 to drive the roller 41 against the ends of the magnetic tape or leader tape which are vacuum retained in the grooves 29a and 29b of the first holding block 29 and the groove 30a of the second holding block 30. The end of the leader tape 3 or the end of the magnetic tape 6 held in the groove 29a or 29b of the first holding block 29 is thereby selectively spliced with end of the leader tape 3 or the end of the magnetic tape 6 held in the groove 30a of the second holding block 30 by the splicing tape 38 cut to the predetermined length.

In turn, the following describes the above-mentioned revolving means 42 for winding the tape by reference to FIG. 1. The revolving means 42 comprises a revolution drive source (not shown) and a reel base 43 shown in FIGS. 15 and 16. The reel base 43, as shown in FIGS. 15 and 16, is shaped like disk and fixed on the revolution drive source. The reel base 43 has at its center a hole 43a, the diameter of which is virtually equal to that of the center hole of the hub 9. The hole 43a has convex portions and concave portions 43b spaced equally with those of the center hole of the hub 9. The winding position 26 is on the reel base 43.

The hub 9 moved to the winding position 26 by the moving means 22 is integrated with the reel base 43 by causing the hub shaft 24 to move downward in FIG. 16 until its convex portions and concave portions engage with those of the center hole of the hub 9 and those of the hole 43a of the reel base 43. The convex portions 24a then engage with the concave portions 43b. When the reel base 43 is revolved by the revolution drive source, the hub 9 also is revolved to wind the leader tape 3 and magnetic tape 6 onto it.

Figure 4:
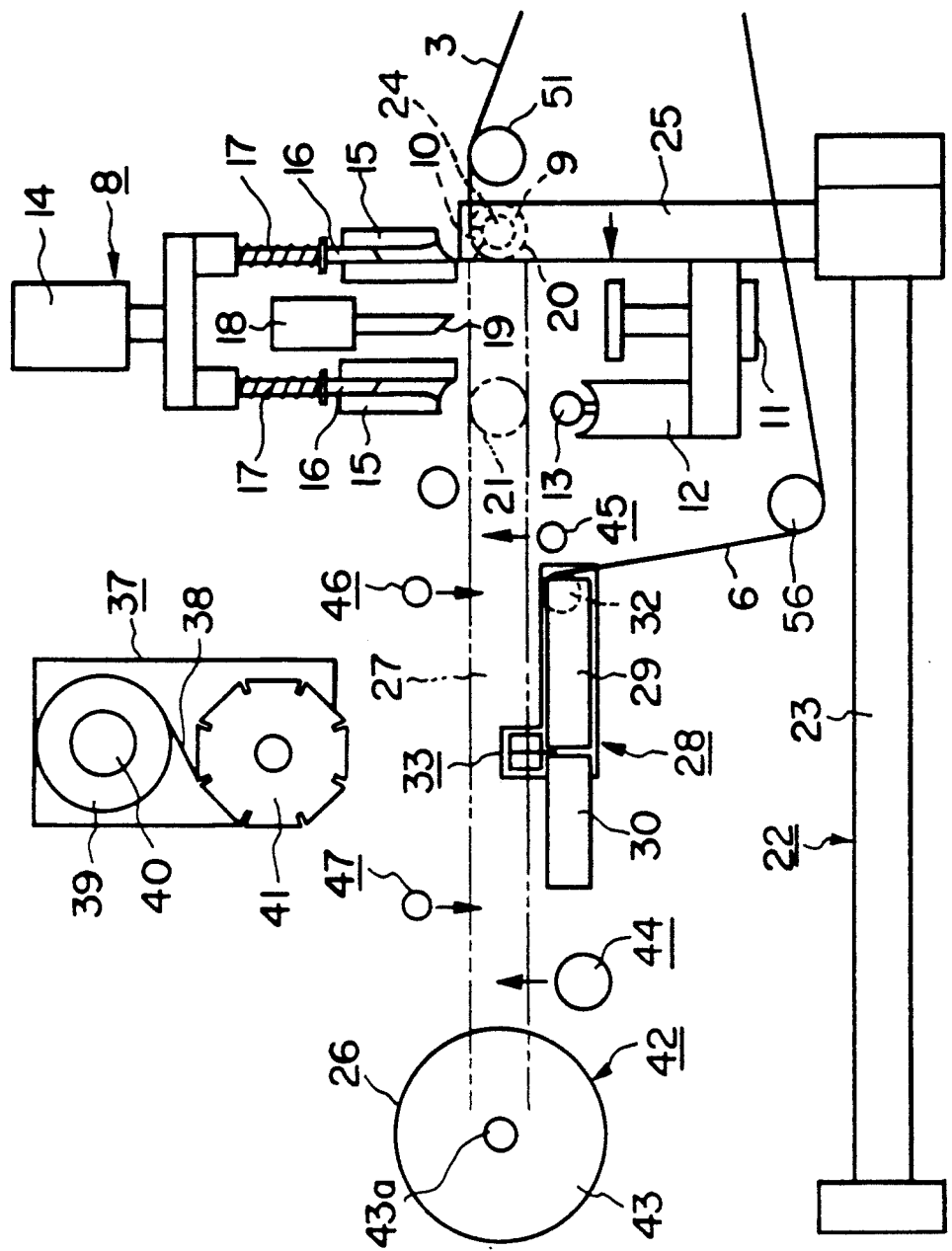
FIG. 4 is an enlarged plan view illustrating the means for moving a hub.
Figure 5:
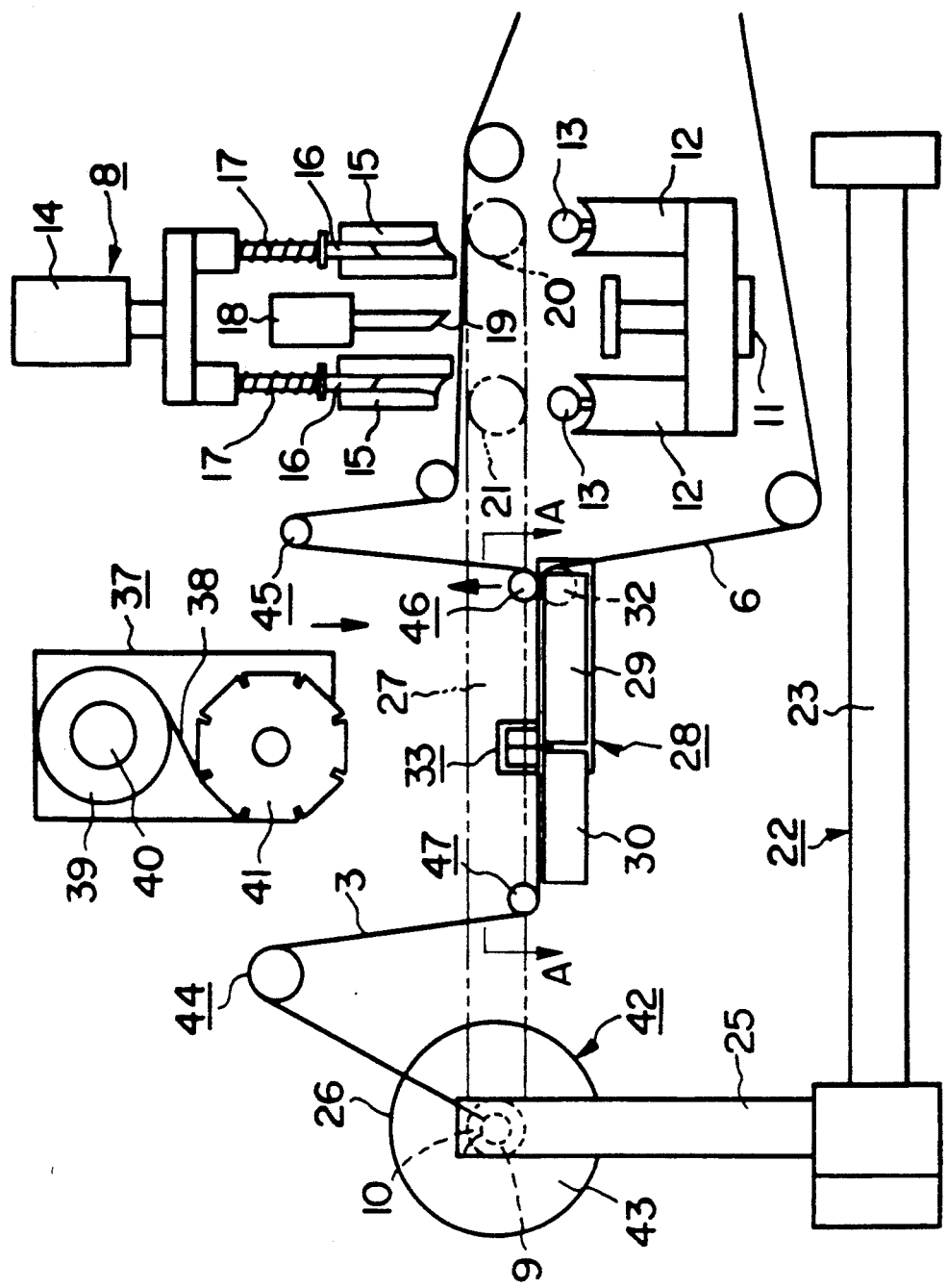
FIG. 5 is an enlarged plan view for illustrating the means for pulling a leader tape out.
Figure 6:
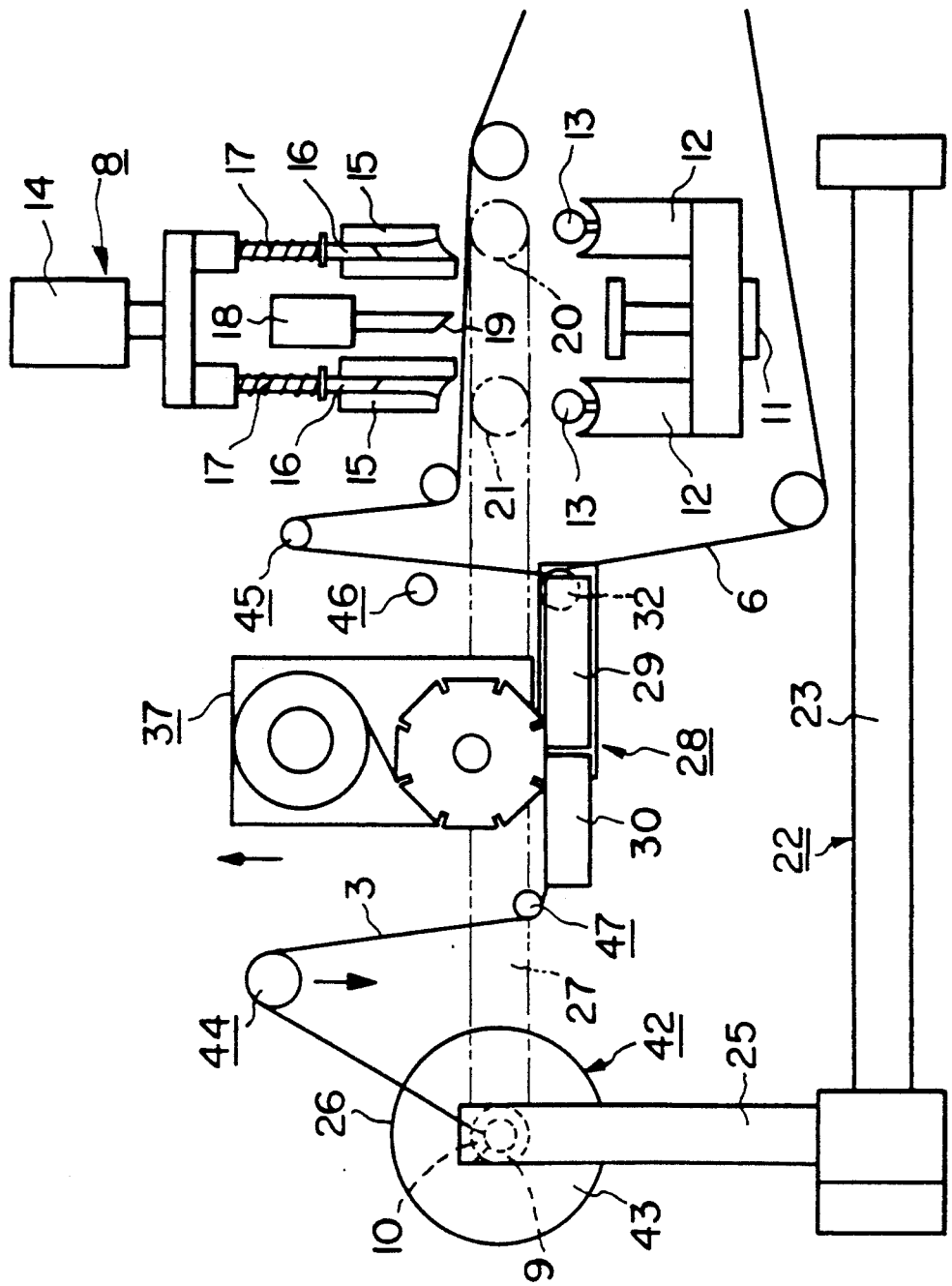
FIG. 6 is an enlarged plan view for illustrating the means for splicing a magnetic tape with the leader tape.
Figure 7:
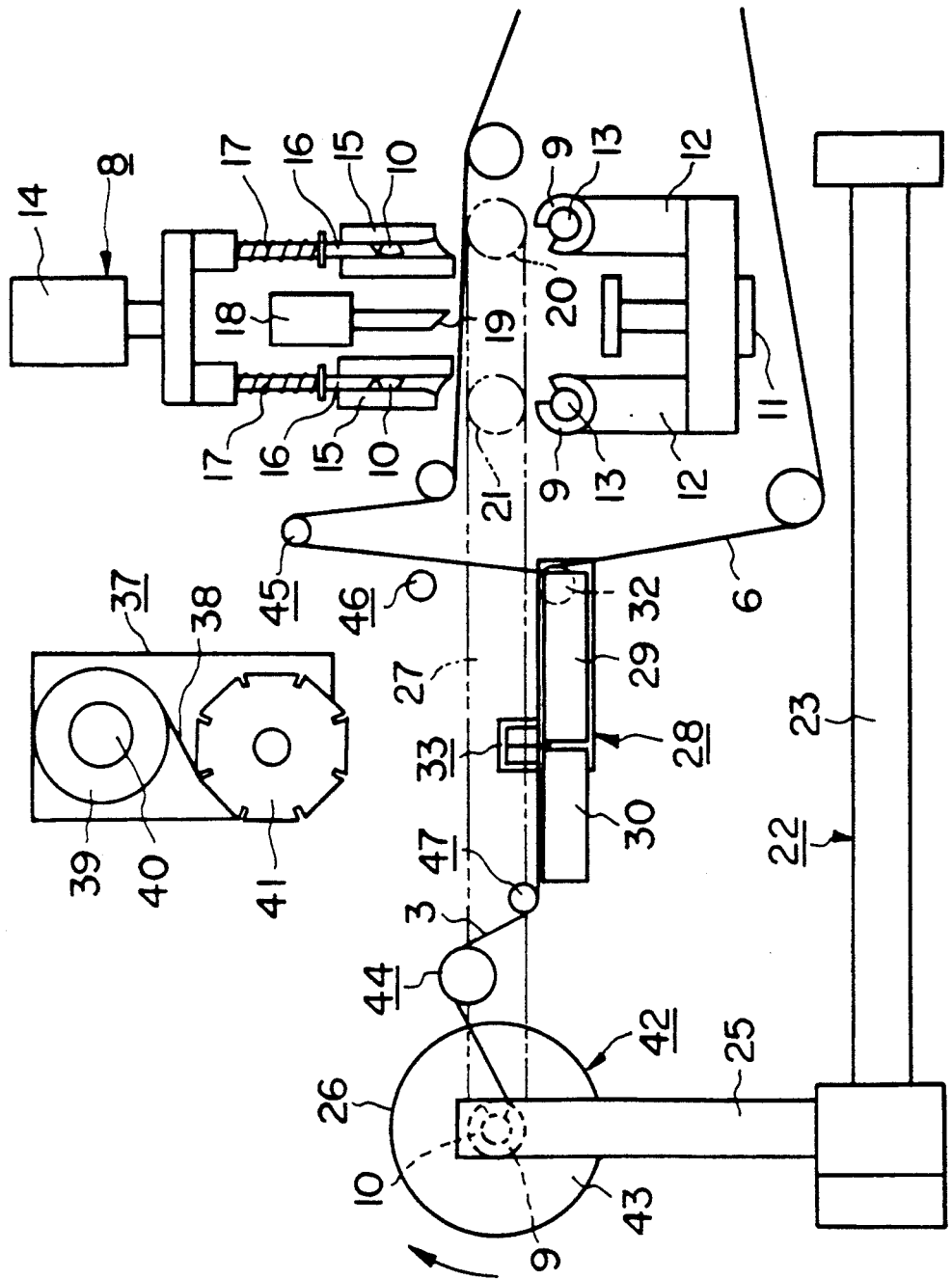
FIG. 7 is an enlarged plan view for illustrating the means before the leader tape and the magnetic tape are wound.

A first leader tape length setting means 44 is fixed on a reciprocal drive source (not shown) by a guide roller. The first leader tape length setting means 44 can be positioned by the reciprocal drive source on either side of the traveling path 27 for the hub 9 as shown in FIGS. 4, 5 and 6 and at an intermediate position between the two positions, or close to the reel base 43, as shown in FIG. 7. The first leader tape length setting means 44 is moved outside the traveling path 27 for the hub 9, on the side of the splicing means 37, to draw the leader tape 3 out to a set length from the end of the leader tape clamped onto the hub 9 positioned at the winding position 26 (see FIG. 6). The first leader tape length setting means 44 also can restrict the widthwise movement of the magnetic tape 6 which is wound onto the hub 9 by being moved close to the reel base 43 shown in FIG. 7.

The first leader tape length setting means 44 further can be positioned not to touch the leader tape 3 and the magnetic tape 6 by being moved outside of the shifting means 28 for the traveling path 27 for the hub 9 as shown in FIG. 4.

A second leader tape length setting means 45, like the first leader tape length setting means 44, is fixed on a reciprocal drive source (not shown) by a guide roller. The second leader tape length setting means 45 can be positioned by the reciprocal drive source on either side of the traveling path 27 for the hub 9 as shown in FIGS. 4, 5 and 6. Guide rollers 50, 51 and 52 which are fixed on the base plate 1 can guide the leader tape 3. The second leader tape length setting means 45 is moved outside the traveling path 27 on the side of the splicing means 37 to draw the leader tape 3 out from the leader tape supply 2 to a set length from the hub position 21.

Two guide devices 46 and 47 are fixed on a reciprocal drive source (not shown) by a guide roller. The guide devices 46 and 47 can be moved by the reciprocal drive source between a position outside of the traveling path 27 for the hub 9 on the side of the splicing means 37 and a position close to the shifting means 28, as shown in FIGS. 5, 6 and 7. The two guide devices 46 and 47 can guide the leader tape 3 or the magnetic tape 6 onto the first holding block 29 and the second holding block 30 by being moved close to the shifting means 28 shown in FIGS. 5, 6 and 7.

A measuring roller 48 can measure a length of the magnetic tape 6 supplied from the magnetic tape supplying means 5 as shown in FIG. 1. A tension arm 49 gives a proper tension to the magnetic tape 6. Also, guide rollers 54, 55 and 56 which are fixed on the base plate 1 can guide the magnetic tape 7.

In turn, the following describes operation of the apparatus for winding magnetic tape according to the present invention by referring to FIGS. 4 to 10 and 18. First, a setup operation is described below before beginning the automatic operation. FIG. 1 shows the apparatus for winding magnetic tape when set up.

Figure 18:
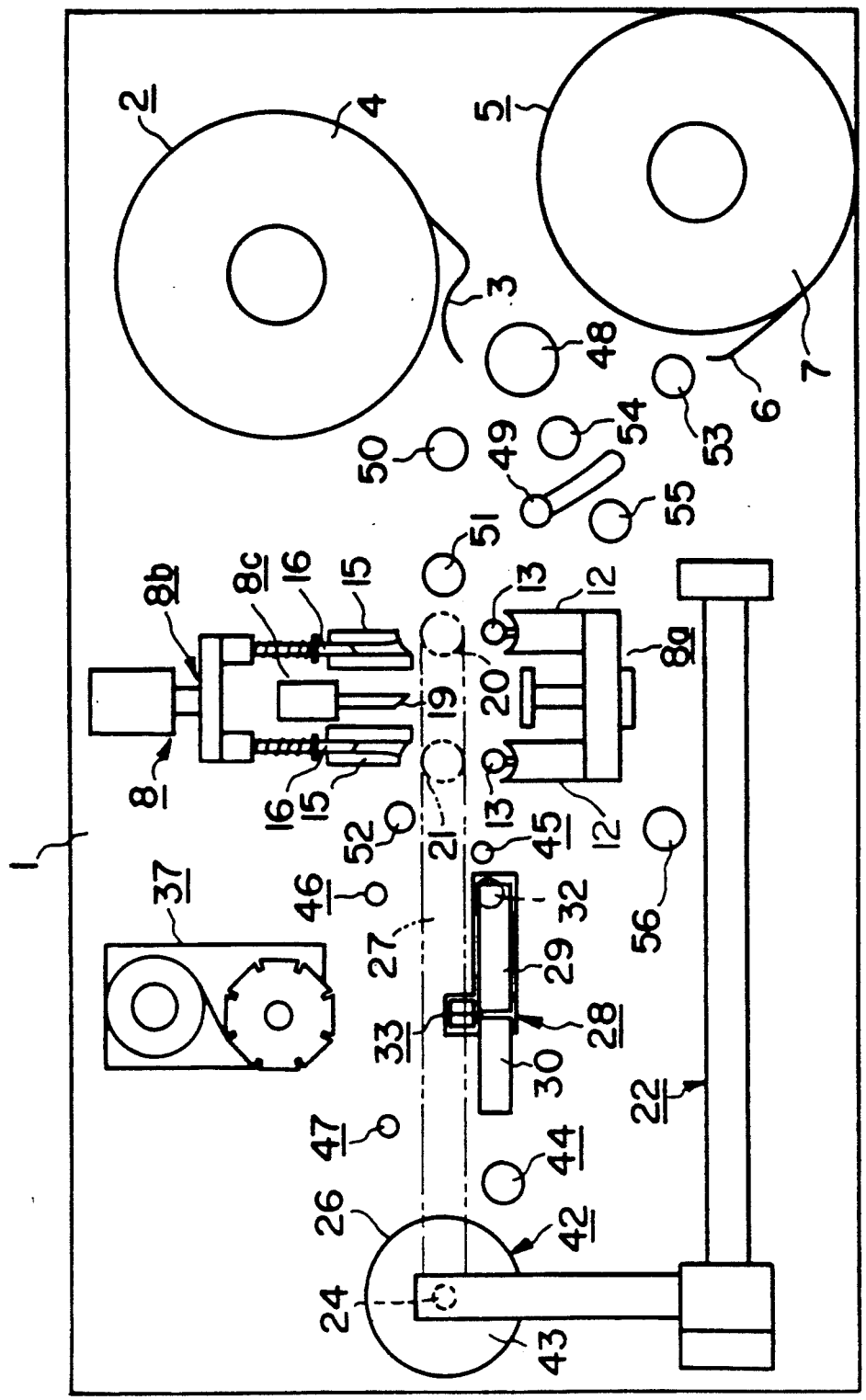
FIG. 18 is a plan view for an initial state of the first embodiment of the present invention.

FIG. 18 shows the initial state before power is turned on. The members of the clamping means 8 are retracted back from the clamp positions 20 and 21, as shown in FIG. 18. The hub shaft 24 for the moving means 22 is positioned at the winding position 26, as shown in FIG. 18. The groove 29a of the first holding block 29 is aligned with the groove 30a of the second holding block 30, as shown in FIG. 3.

The splicing means 37 is completely retracted from the shifting means 28, as shown in FIG. 18. The first leader tape length setting means 44 and the second leader tape length setting means 45 are retracted, as shown in FIG. 18, and are positioned outside the traveling path 27 for the hub 9 on the side of the shifting means 28. The guide devices 46 and 47 are retracted, as shown in FIG. 18 and are positioned outside the traveling path 27 for the hub 9 on the side of the splicing means 37.

In the state described above, the setup procedures should be made as follows.

(1) The leader tape 3 is drawn out of the leader tape supplying means 2 by hand and passed around and between the guide rollers 50, 51 and 52. The leader tape 3 is held between the retaining rods 12 and the clamp holders 15.

(2) The retaining rods 12 and the retaining shafts 13 holding the hubs 9 are extended to move the two hubs 9 to the clamp positions 20 and 21 and to hold the hubs 9.

(3) The clamp holders 15 and the clamp rods 16 are moved toward the clamp positions 20 and 21. The cutting blade 19 cuts the leader tape 3 right before the hubs 9 clamp the retaining pieces 10 supplied into the grooves 15a of the clamp holders 15.

(4) The clamp rods 16 clamp the retaining pieces 10 onto the hubs together with the leader tape 3 at the clamp positions 20 and 21.

(5) The retaining shafts 13 release the hubs 9. The clamp holders 15, the clamp rods 16, the retaining rods 12, the retaining shafts 13, and the cutting blade 19 are then retracted back from the clamp positions 20 and 21.

(6) The hub 9 at the clamp position 21 is discarded by hand.

(7) The magnetic tape 6 is drawn out of the magnetic tape supplying means 5 by hand. The free end of the magnetic tape 6 is threaded between and around a guide roller 53, a measuring roller 48, a guide roller 54, a tension arm 49 and guide rollers 55, 56, and 32 and is then placed onto the air suction means of the groove 29a of the first holding block 29 and the groove 30a of the second holding block 30, as shown in FIG. 3.

(8) The cutting device 33 then cuts the portion of the magnetic tape 6 held between the first holding block 29 and the second holding block 30 with a blade 36.

(9) The portion of the cut magnetic tape 6 held by the second holding block 30 is discarded by hand.

(10) The first holding block 29 is moved, as shown in FIG. 2. The groove 29b of the first holding block 29 is now aligned with the groove 30a of the second holding block 30.

This completes the setup procedures, and the setup state is shown in FIG. 1.

The following describes the automatic operation for fabricating the so-called spectacles.

Figure 14:
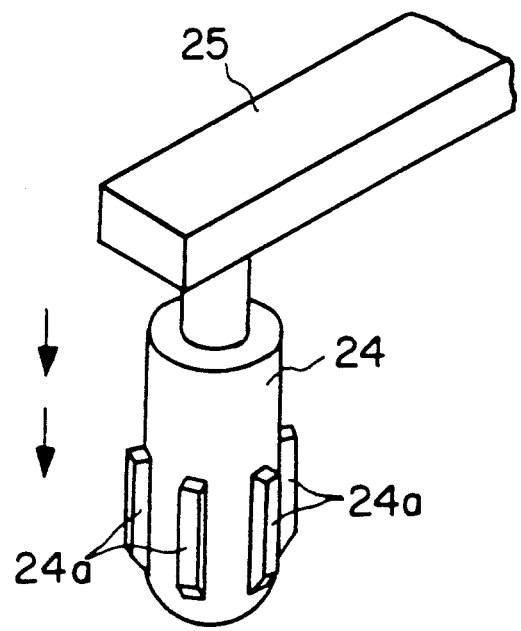
FIG. 14 is an enlarged, perspective view for a hub shaft.

(1) The moving means 22 moves the hub shaft 24 shown in FIG. 14 to the clamp position 20 shown in FIG. 4. The moving means 22 also drops the hub shaft 24 to a lower intermediate position, indicated in FIG. 4, to fit with the hub 9. The moving means 22 further moves the hub 9, together with the clamped leader tape 3, from the clamp position 20 to the reel base 43.

(2) The guide devices 46 and 47 are moved from the retracted position, indicated in FIGS. 1 and 4, to an extended position down close to the shifting means 28, as shown in FIG. 5, to place the leader tape 3 at a point where it can be sucked into the grooves 30a and 29b of the shifting means 28 where the leader tape 3 is vacuum held.

(3) The first leader tape length setting means 44 and the second leader tape length setting means 45 are moved from the positions shown in FIGS. 1 and 4 away from the traveling path 27 and toward the side of the splicing means 37, as shown in FIG. 5. This draws a predetermined length of the leader tape 3 out of the leader tape supplying means 2.

(4) The cutting device 33 then cuts the leader tape 3 retained between the blocks 29 and 30 with the blade 36.

(5) The guide means 46 on the side of the clamping means 8 is moved away from the traveling path 27, toward the side of the splicing means 37.

(6) The first holding block 29 is moved vertically downward toward the base plate 1 to return to the state shown in FIG. 3, i.e. with the grooves 29a and 30a aligned. The splicing means 37 is advanced toward the holding blocks 29 and 30 to the position indicated in FIG. 6 and presses the splicing tape 38 on the roller 41 against the end of the magnetic tape 6, retained in the groove 29a of the first holding block 29, and the end of the leader tape 3 retained in the groove 30a of the second holding block 30, to thereby splice the cut ends of the magnetic tape 6 and the leader tape 3 together, as shown in FIG. 3. After this, the splicing means 37 is retracted to the home position, as shown in FIG. 7.

(7) The first leader tape length setting means 44 is moved from the position indicated in FIG. 6 to a position close to the reel base 43 shown in FIG. 7. At the same time, the moving means 22 further moves the hub shaft 24 down, as shown in FIG. 14. This engages the convex portions and concave portions of the hub shaft 24 with those of the center hole of the hub 9 and the hole 43a of the reel base 43 to obtain an integrated hub and reel base 43, as shown in FIG. 6.

(8) The groove 29a of the first holding block 29, which is at the position indicated in FIG. 3, is released from the groove 30a of the second holding block 30.

(9) The revolving means 42 then revolves the hub 9 on the reel base 43 to wind the preceding leader tape 3 (innermost turn) and a predetermined length of the magnetic tape 6.

Figure 8:
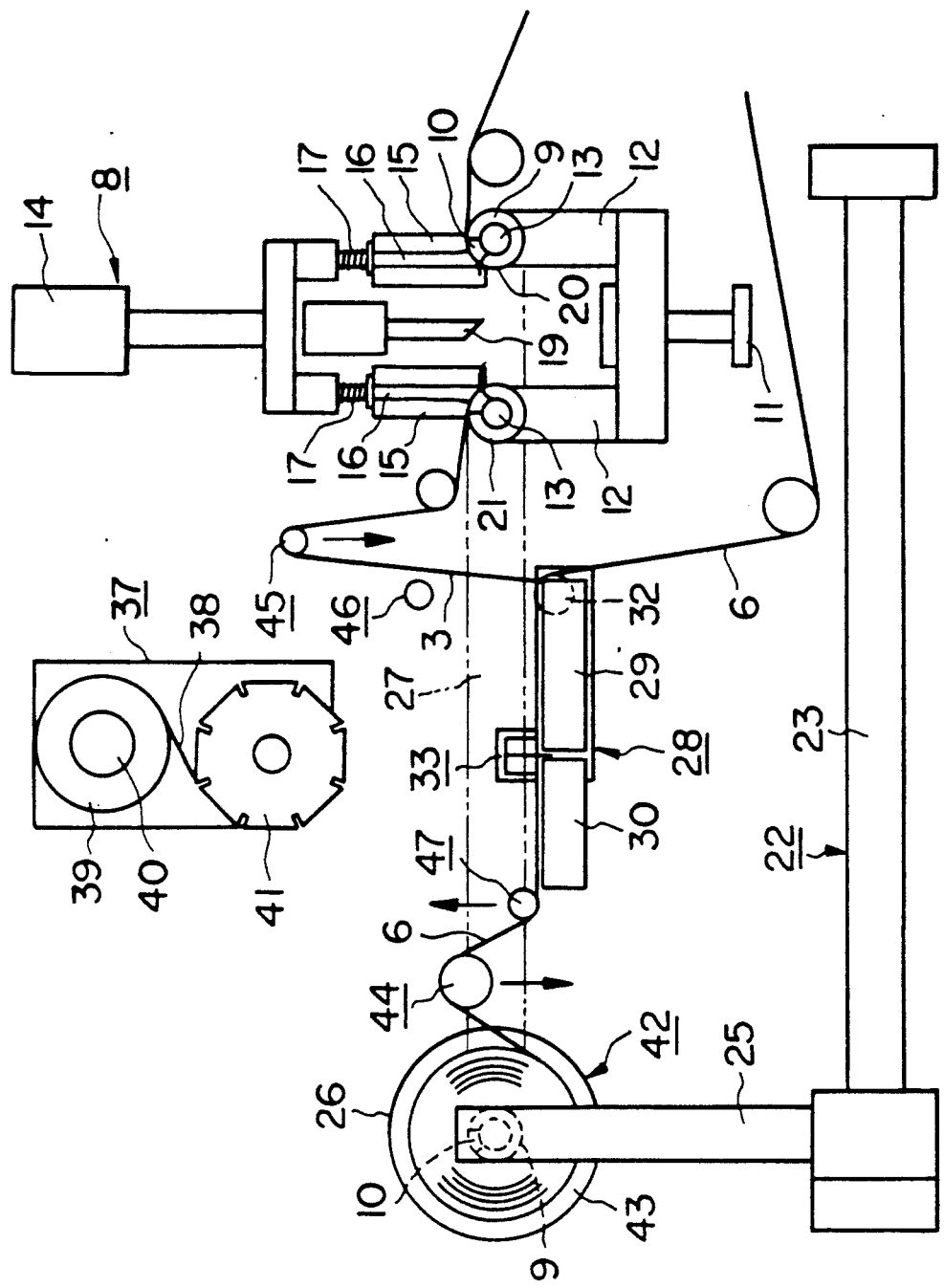
FIG. 8 is an enlarged plan view for illustrating the means when the next hub is clamped onto the leader tape after the leader tape and the magnetic tape are wound.

(10) While the revolving means 42 is winding the tape, the clamping means 8 holds newly supplied hubs 9 at the clamp positions 20 and 21, cuts a new section of leader tape 3, and clamps newly supplied retaining pieces 10 on the retained hubs 9 together with the leader tape 3 (FIG. 8).

(11) The clamping means 8 releases the hubs 9 from the clamp positions 20 and 21 and moves the members of the clamping and splicing means 8 back from the clamp positions 20 and 21.

(12) When the revolving means 42 finishes winding, the groove 29a of the first holding block 29 and the groove 30a of the second holding block 30 vacuum hold the magnetic tape 6, and the cutting device 33 cuts the magnetic tape 6 between the holding blocks 29 and 30.

(13) The first holding block 29 is moved to the position, as shown in FIG. 2, i.e. with the guide grooves 29b and 30a aligned. The splicing means 37 is advanced again to splice the end of the succeeding leader tape 3 (outermost turn) retained in the groove 29b of the first holding block 29 with the end of the magnetic tape 6 retained in the groove 30a of the second holding block 30.

Figure 9:
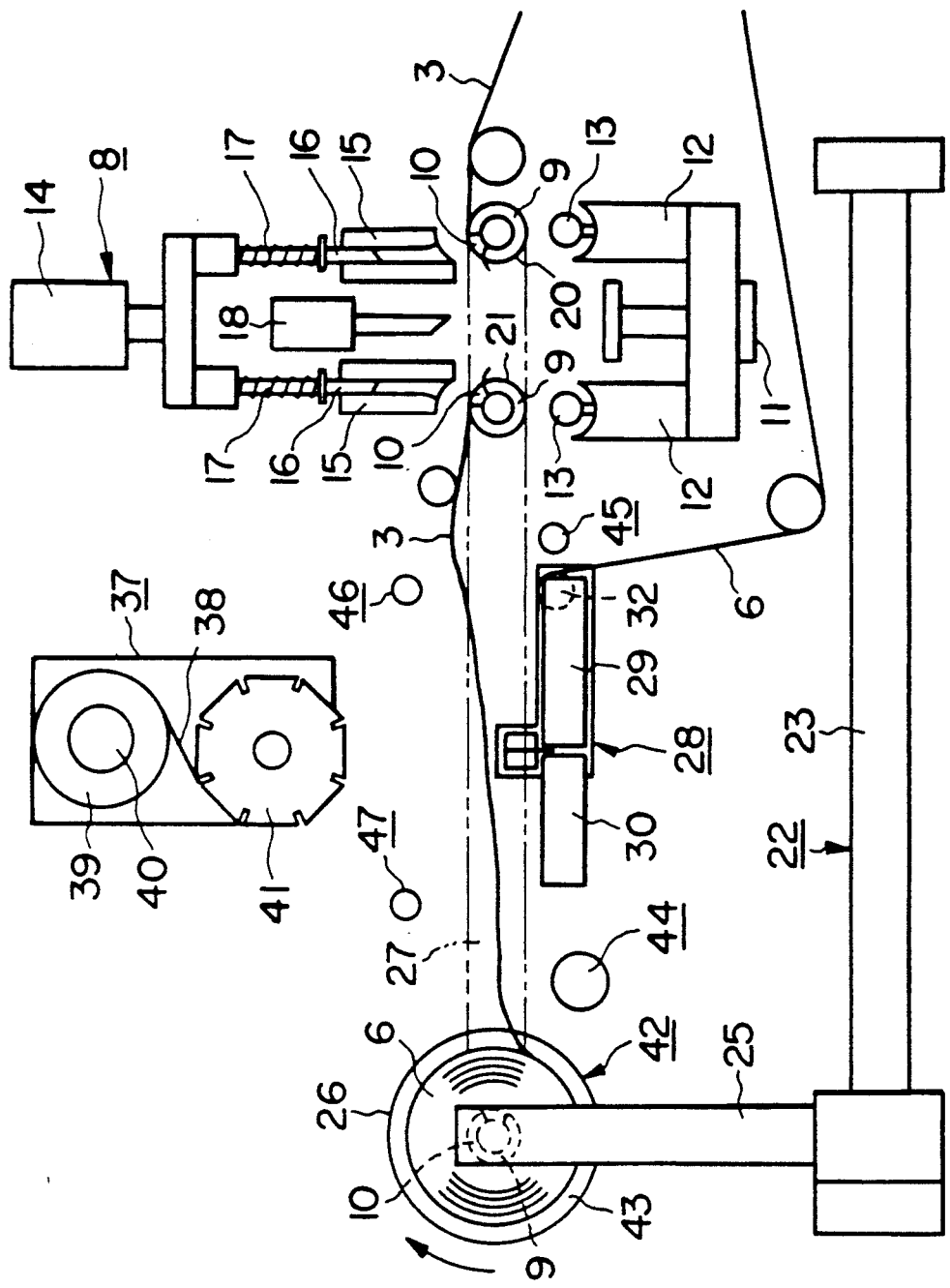
FIG. 9 is an enlarged plan view for illustrating the means before the succeeding leader tape is wound.

(14) The first leader tape length setting means 44 and the second leader tape length setting means 45 are next retracted beyond the traveling path 27 in the direction of the shifting means 28, as shown in FIG. 9. The guide means 47 is moved beyond the traveling path 27 in the direction of the splicing means 37, as shown in the Figure.

Figure 10:
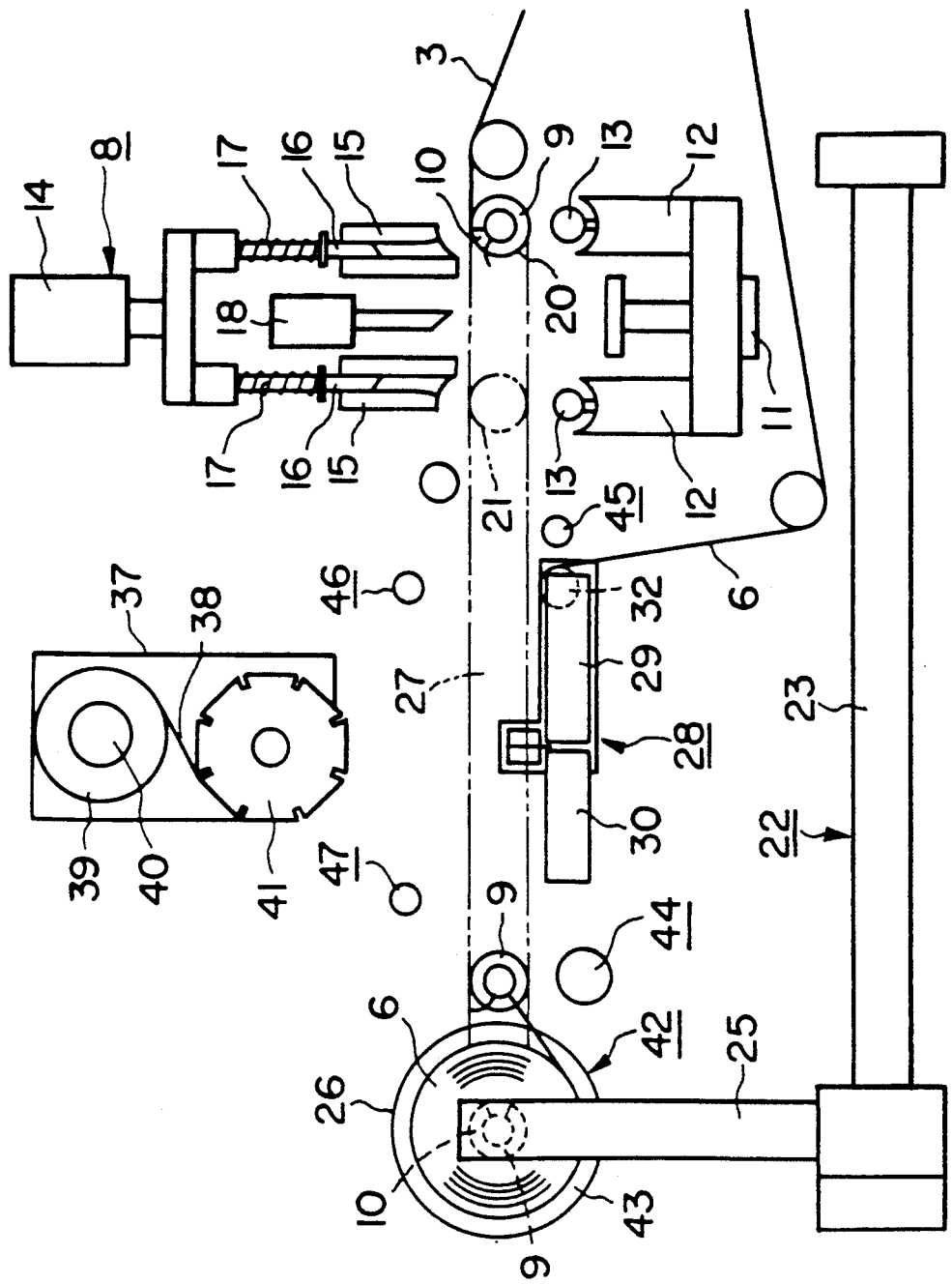
FIG. 10 is an enlarged plan view for illustrating the means after the succeeding leader tape is wound.

(15) The revolving means 42 thereafter again revolves the hub on the reel base 43 to wind the succeeding leader tape 3 (outermost turn) and the magnetic tape 6 spliced therewith, and move the hub 9 at the clamp position 21 to the winding position 26 (FIGS. 9 and 10).

(16) The moving means 22 moves the hub shaft 24 vertically up before moving to the clamp position 20.

(17) The spectacles at the winding position 26 are removed either by hand or an exhaust means (not shown).

Steps (1) through (17) are repeated to automatically fabricate the spectacles in which the magnetic tape 6 has the leader tape 3 spliced at the innermost and outermost turns thereof.

For the purpose of illustration only, the present invention has been illustrated by the above embodiment. Of course, the present invention shall not be limited to the above embodiment.

Other embodiments are available in accordance with the aspects of the present invention. In the above embodiment, the first holding block 29 and the second holding block 30 are fixed outside the traveling path 27 for the hubs 9, and the guide devices 46 and 47 guide the leader tape 3 and the magnetic tape 6 onto the shifting means 28 to make it possible to move them from the clamp positions 20 or 21 to the winding position 26 and to cut and splice the leader tape 3 and the magnetic tape 6 together.

Figure 11:
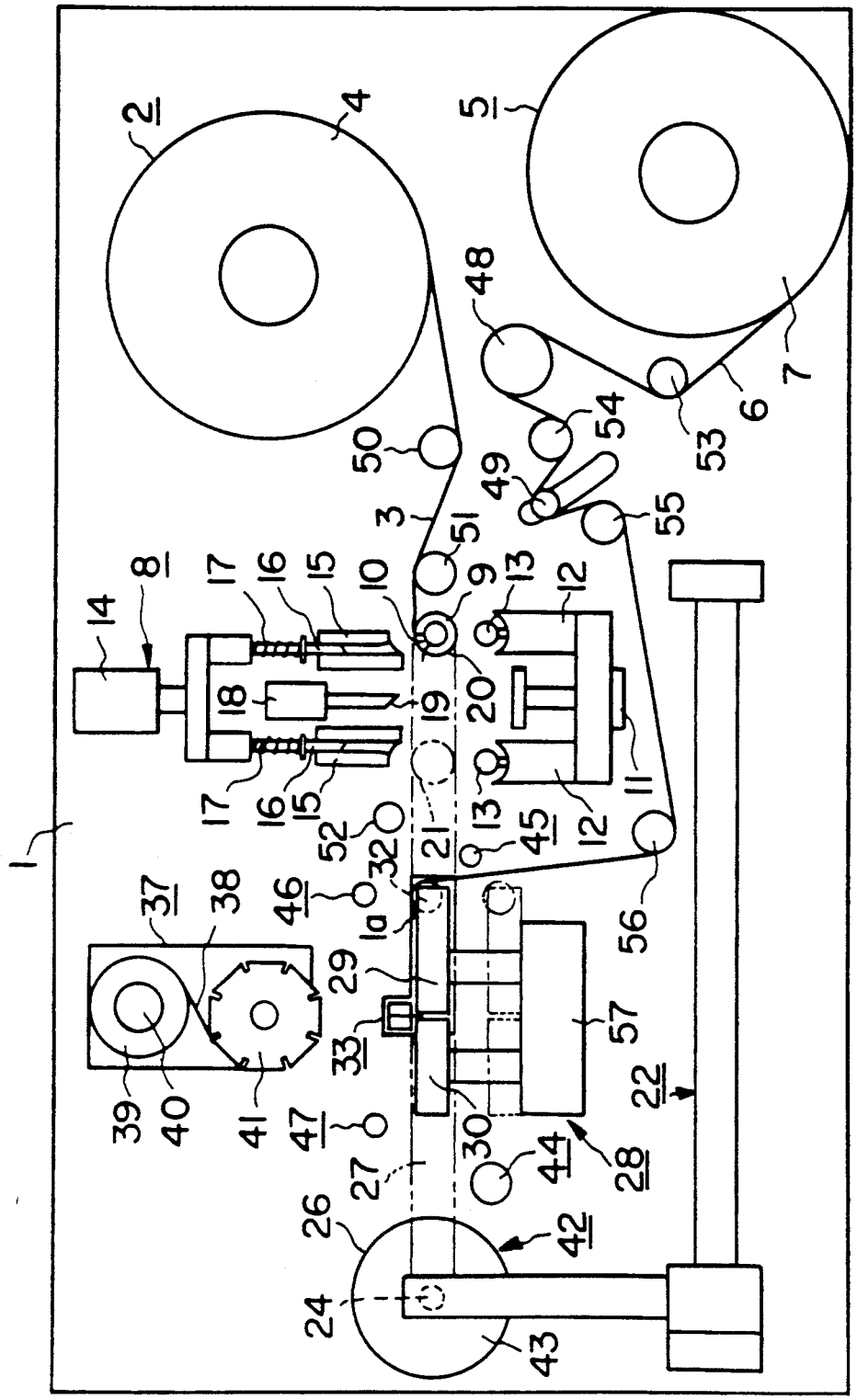
FIG. 11 is a plan view of another embodiment of the present invention for an apparatus for winding magnetic tape.

As an alternative example, as shown in FIG. 11, such an operation can be made by causing the first holding block 29 and the second holding block 30 of the shifting means 28 to be moved inside and outside the traveling path 27 for the hubs 9 by a reciprocal drive source 57. If the moving means 22 moves the hub 9 from the clamp position 20 or 21 to the winding position 26, the first holding block 29 and the second holding block 30 are moved outside the traveling path 27 for the hubs 9. For the cutting and splicing operation, they are moved inside the traveling path 27 for the hubs 9. In this example, the guide devices 46 and 47 may not be needed. When these are provided, suction of the leader tape 3 or the magnetic tape 6 to the shifting means 28 can be made stable. In the preferred embodiment, the base plate 1 has a through hole 1a provided to move the first holding block 29 and the second holding block 30 inside the traveling path 27 for the hubs 9 to change the alignment of the grooves 29a and 29b with the groove 30a. It is hard to move the hubs 9. To solve this problem, an additional cover device is provided to cover over the through hole 1a on the traveling path 27 when the hubs 9 are moved on the traveling path 27.

Alternatively, the method of the moving means 22 can be changed as follows.

In the preferred embodiment, the moving means 22 has the hub shaft 24 engage with the center hole of the hub 9 to move the hub 9. The alternative moving method is that an additional chuck device is provided to grasp the inside or the outside of the hub 9. This allows a reel for a video tape or the like to have leader tape and magnetic tape wound therein. It need hardly be said that the clamping means 8 has to be varied to accommodate hubs of various forms.

The first leader tape length setting means 44 and the second leader tape length setting means 45 are not needed if the distances between the winding position 26 and the shifting means 28 and between the clamp position 21 and the shifting means 28 are set to a predetermined leader tape length in advance.

Figure 12:
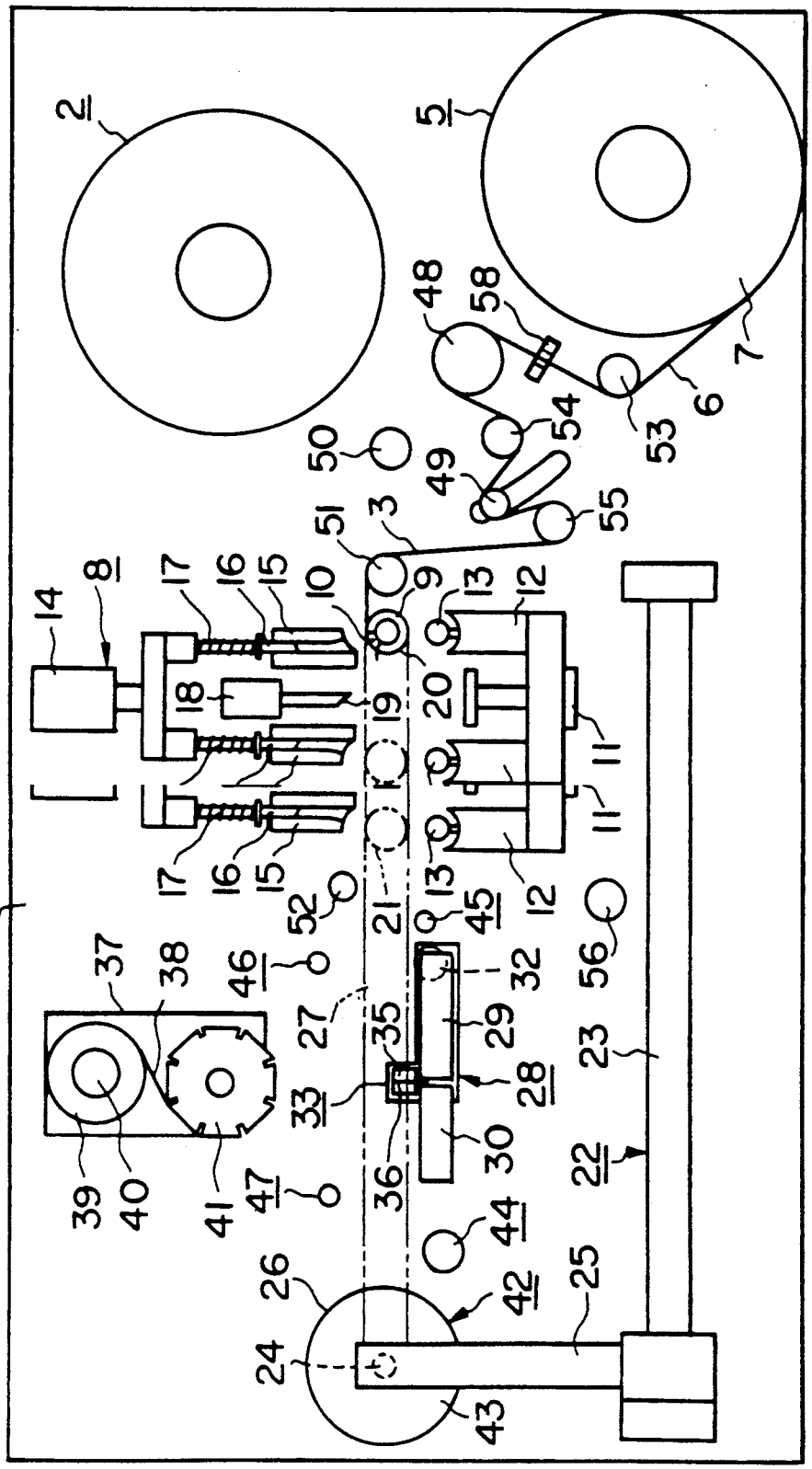
FIG. 12 is a plan view for still another embodiment of the present invention for an apparatus for winding magnetic tape.
Figure 13:
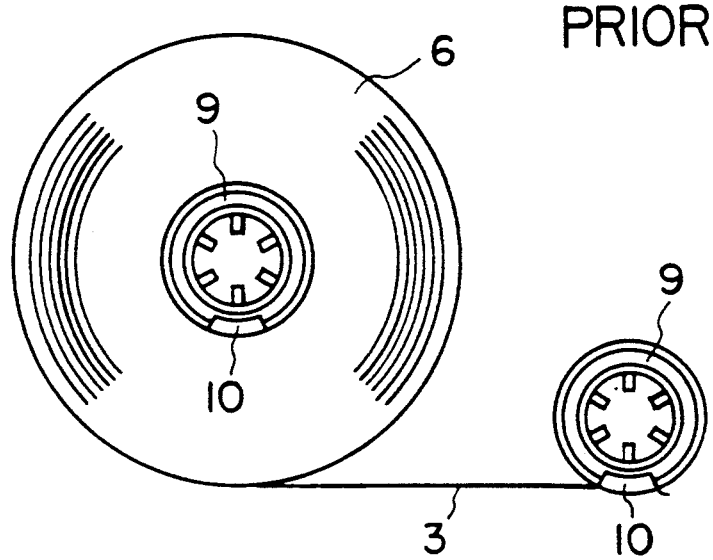
FIG. 13 is a plan view for spectacles.

As another example, a transparency sensor 58, as shown in FIG. 12, can be provided to detect the leader tape 3 between the magnetic tape supplying means 5 and the clamping means 8. This allows using a reel having the leader tape 3 already spliced with the magnetic tape 6 at predetermined intervals. In this example, the reel having the magnetic tape with leader tape wound thereon is put on the magnetic tape supplying means 5 and the leader tape supplying means 2 is not used. The magnetic tape with the leader tape then is guided to the reel base 43 around the guide roller 53, through the transparency sensor 58, around the measuring roller 48, the guide roller 54, the tension arm 49, and the guide rollers 55 and 51. In this example, the shifting means 28, the first leader tape length setting means 44, and the second leader tape length setting means 45 are positioned outside the traveling path 27 for the hubs 9 and not operated, since these are not used. In such a construction, the operation is as follows. Firstly, the clamping means 8 clamps the hub 9 onto the leader tape portion. The moving means 22 moves to the reel base 43 the hub 9 clamped onto the leader tape at position 20. Secondly, the revolving means 42 revolves the hub 9 to wind the magnetic tape with the leader tape.

Thirdly, the transparency sensor 58 detects the next leader tape before the revolving means 42 stops winding when the leader tape is wound to the clamp positions 20 and 21 for the clamping means 8. The clamping means 8 can clamp the leader tape onto one of newly supplied hubs 9 with retaining pieces 10. The revolving means 42 starts revolving again to move the hub 9 at the clamp position 21 to the winding position 26. The operation described above is repeated to automatically fabricate spectacles.

Further, it is preferable to put a check device in between the reel base 43 and the first leader tape length setting means 44 to check or release moving of the hub 9 by the revolving means 42. This allows the hub 9 to be checked when the revolving means 42 finally moves the hub 9 at the clamp position 21 to the winding position 26. Thus, the distance between the pair of hubs 9 can be preset so that the spectacles can be put in a cassette case as is.

The apparatus for winding the magnetic tape of the present invention includes the steps of producing spectacles wherein the magnetic tape and the leader tape are supplied from the different reels to produce the spectacles having the magnetic tape wound therein which contain the leader tape in the innermost and outermost turns of the pair of hubs. In the method, the steps of clamping the leader tape onto the hub and tape cutting, splicing, and winding are carried out in the same path. Therefore, the apparatus is simple in the structure and efficient in fabricating the spectacles in a short production cycle.

With the detecting device provided in the third embodiment, there are two methods available for fabricating the spectacles having the magnetic tape wound therein which has the leader tape on the innermost and outermost turns thereof on the pair of hubs. In one method one reel has only the magnetic tape wound thereon and the other reel has only the leader tape wound thereon. In the other method the magnetic tape has the leader tape prespliced therewith at predetermined intervals.

Although the present invention has been shown and described with respect to preferred embodiments, various changes and modifications which are obvious to a person skilled in the art to which the invention pertains are deemed to lie within the spirit and scope of the invention.

What is claimed is:

1. A method of winding lengths of magnetic tape and leader tape onto a pair of hubs, comprising the steps of:
   a) drawing out by one end a leader tape supplied from a leader tape supply reel and clamping a hub to the end of the leader tape;
   b) taking the hub which is clamped onto the end of the leader tape from the leader tape supply reel as the first hub and moving the first hub along a traveling path to a winding position;
   c) cutting the leader tape at a splicing position which is located a predetermined distance from the first hub, splicing the cut, first end of the leader tape portion connected to the first hub with an end of a length of magnetic tape from a supply reel, and retaining the unspliced, second end of the cut leader tape at the splicing position;
   d) revolving the first hub at the winding position to wind the spliced together length of leader tape and a predetermined length of magnetic tape onto the first hub;
   e) retaining the magnetic tape at the splicing position;
   f) clamping two new hubs to the leader tape between the second end of the cut leader tape and the leader tape supply reel and cutting the leader tape between the two new hubs, the hub which is clamped onto the portion of the leader tap retained at the splicing position thereafter being considered as the second hub;
   g) cutting the magnetic tape retained at the splicing position and splicing the cut end of the magnetic tape to the second end of the leader tape;
   h) winding the magnetic tape and spliced-on leader tape onto the first hub; and
   i) removing the first hub and the second hub.

2. A method of winding lengths of magnetic tape and leader tape onto a pair of hubs according to claim 1, wherein the steps b–i, inclusive, are sequentially repeated.

* * * * *